(12) United States Patent
Inuzuka

(10) Patent No.: US 11,491,988 B2
(45) Date of Patent: Nov. 8, 2022

(54) DRIVING ASSISTANCE DEVICE

(71) Applicant: TOYOTA JIDOSHA KABUSHIKI KAISHA, Toyota (JP)

(72) Inventor: Yasuhiro Inuzuka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 266 days.

(21) Appl. No.: 15/865,940

(22) Filed: Jan. 9, 2018

(65) Prior Publication Data

US 2018/0237013 A1  Aug. 23, 2018

(30) Foreign Application Priority Data

Feb. 21, 2017 (JP) .............................. JP2017-030377

(51) Int. Cl.
*B60W 30/182* (2020.01)
*B60W 30/10* (2006.01)
*G06F 3/01* (2006.01)
*B60W 50/08* (2020.01)
*G06F 3/0362* (2013.01)
*B60K 37/06* (2006.01)
*G06F 3/0354* (2013.01)
*B60W 50/14* (2020.01)

(52) U.S. Cl.
CPC ........... *B60W 30/182* (2013.01); *B60K 37/06* (2013.01); *B60W 30/10* (2013.01); *B60W 50/08* (2013.01); *B60W 50/14* (2013.01); *G06F 3/017* (2013.01); *G06F 3/0362* (2013.01); *G06F 3/03547* (2013.01); *B60K 2370/143* (2019.05); *B60K 2370/175* (2019.05); *B60W 2050/143* (2013.01); *B60W 2050/146* (2013.01); *B60W 2420/24* (2013.01)

(58) Field of Classification Search
CPC .... B60W 30/182; B60W 30/10; B60W 50/08; B60W 2540/23; B60W 60/0053; B60K 37/06; B60K 2370/143; B60K 2370/175; G06F 3/017; G06F 3/03547; G06F 3/0362; B62D 1/12; G05G 1/58
See application file for complete search history.

(56) References Cited

U.S. PATENT DOCUMENTS

| 2008/0201994 | A1* | 8/2008 | Crago | .................. | E01H 5/06 |
| | | | | | 37/197 |
| 2011/0113368 | A1* | 5/2011 | Carvajal | ............... | G06F 3/0482 |
| | | | | | 715/810 |

(Continued)

FOREIGN PATENT DOCUMENTS

| JP | 2002-315728 A | 10/2002 |
| JP | 2005-149058 A | 6/2005 |

(Continued)

*Primary Examiner* — Lail A Kleinman
(74) *Attorney, Agent, or Firm* — Oliff PLC

(57) ABSTRACT

In a driving assistance device for a vehicle provided with an automatic driving mode and a manual driving mode, a standby member is provided to allow a driver seated at a seat to rest an arm. A sensor senses that a hand of a driver is placed at a position where the driver can reach the sensor while the driver rests the arm on the standby member. The sensor senses that a finger of the driver is in contact with the sensor. The sensor is provided in an arm rest.

5 Claims, 6 Drawing Sheets

(56) References Cited

U.S. PATENT DOCUMENTS

| | | | | |
|---|---|---|---|---|
| 2012/0110356 A1* | 5/2012 | Yousefi | .................... | H04W 4/40 |
| | | | | 713/320 |
| 2014/0365062 A1* | 12/2014 | Urhahne | .................... | B60T 7/14 |
| | | | | 701/23 |
| 2015/0338922 A1* | 11/2015 | Hamada | .................. | G06V 40/28 |
| | | | | 701/538 |
| 2016/0001781 A1* | 1/2016 | Fung | ....................... | G16H 50/20 |
| | | | | 701/36 |
| 2016/0107597 A1* | 4/2016 | Won | ....................... | G08G 1/167 |
| | | | | 340/439 |
| 2016/0132054 A1* | 5/2016 | Eigel | .................... | B60W 10/184 |
| | | | | 701/23 |
| 2016/0152180 A1* | 6/2016 | Kirsch | .................. | B60W 40/08 |
| | | | | 701/36 |
| 2017/0334452 A1* | 11/2017 | Abe | ....................... | G05D 1/0088 |
| 2018/0037224 A1* | 2/2018 | Bogner | .................. | B60W 10/20 |
| 2018/0113454 A1* | 4/2018 | Emura | ................ | B60W 30/182 |
| 2018/0126990 A1* | 5/2018 | Shimada | ................ | G08G 1/162 |
| 2018/0201165 A1* | 7/2018 | Rekow | ................ | B60N 2/5664 |
| 2018/0208211 A1* | 7/2018 | Chiba | .................. | G05D 1/0088 |
| 2019/0077419 A1* | 3/2019 | Samma | ................ | B60W 40/06 |

FOREIGN PATENT DOCUMENTS

| | | |
|---|---|---|
| JP | 2006-062527 A | 3/2006 |
| JP | 2017-027180 A | 2/2017 |
| WO | 2007/034567 A1 | 3/2007 |

* cited by examiner

DRIVING ASSISTANCE DEVICE

The disclosure of Japanese Patent Application No. 2017-030377 filed on Feb. 21, 2017 including the specification, drawings and abstract is incorporated herein by reference in its entirety.

BACKGROUND

1. Technical Field

The present disclosure relates to driving assistance devices for vehicles.

2. Description of the Related Art

Studies have been made on driving assistance systems configured to control the accelerator, brake, steering, etc. automatically. It is expected that provision of a driving assistance device makes the driver less strained and capable of driving more comfortably, and reduces vehicle accidents. For example, WO2007/034567 discloses a method wherein a signal is transmitted to a steering controller via a cable by manipulating the steering control lever provided in the arm rest of the driver's seat to the right or left so that the vehicle is steered by controlling the motor of the steering device of the handle from the user steering controller.

We have gained the following knowledge regarding a driving assistance device for a vehicle. In the driving assistance device configured to control the accelerator, brake, or steering of a vehicle such as an automobile, it is desired that driver monitor the situation inside and outside the vehicle and be ready to take over the driving at any time. Therefore, a periodical check may be made to see whether the driver is ready to take over the driving, i.e., the driver has a will to take over the driving. For checking of a will to drive, the driver may, for example, be requested to perform a certain operation at predetermined intervals. When the driver is forced to take a straining posture to perform the operation, however, the driver may feel uncomfortable each time the driver performs an operation. In a long driving, the fatigue of the driver may be increased. Based on the foregoing, we have recognized that there is room for improvement in driving assistance devices for vehicles from the standpoint of reducing the strain on the driver in the automatic driving mode.

SUMMARY

The embodiments address this background and a general purpose thereof is to provide a driving assistance device capable of reducing the strain on the driver in the automatic driving mode.

A driving assistance device according to an embodiment is provided with an automatic driving mode and a manual driving mode and comprises: a standby member on which a driver seated at a seat rests an arm; and a sensor that senses that a hand of the driver is placed at a position where the driver can reach the sensor while the driver rests the arm on the standby member.

According to the embodiment, a sensor that senses the hand is provided at a position that can be reached by the driver's hand while the driver rests the arm on the standby member in a standby manner. It is therefore possible to check a will of the driver to drive in the automatic driving mode, based on an output from the sensor.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION

Figure 1:
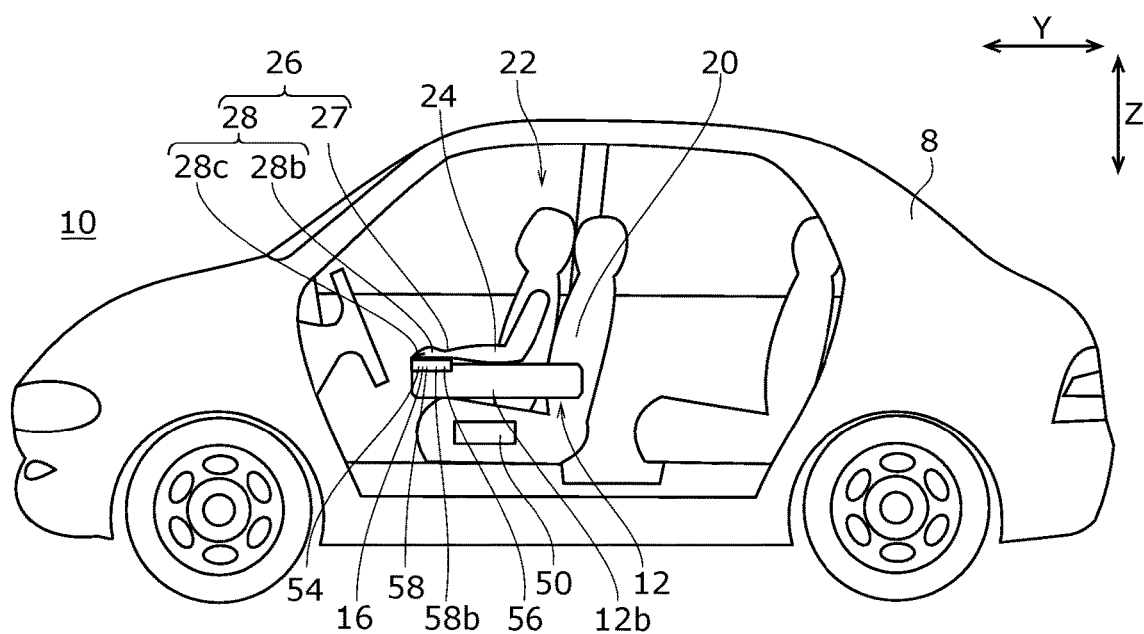
FIG. 1 is a side view of a vehicle provided with a driving assistance device according to an embodiment.

Various embodiments will now be described by reference to the drawings. The embodiments are illustrative and are not intended to be limiting.

Various embodiments will be described with reference to the drawings. In the embodiments and variations, the same or equivalent constituting elements and members shall be denoted by the same reference numerals, and duplicative explanations will be omitted appropriately. The dimension of members in the drawings shall be enlarged or reduced as appropriate to facilitate understanding. Those of the members that are not material to the description of the embodiments are omitted in the drawings.

Terms including ordinal numbers like first and second are used to describe a series of constituting elements, but those terms are used solely for the purpose of distinguishing one constituting element from another and shall not limit the constituting elements.

Embodiment

FIG. 1 is a side view of a vehicle 8 provided with a driving assistance device 10 according to an embodiment. The description below is based on an XYZ Cartesian coordinate system. The X axis direction corresponds to the horizontal right-left direction, the Y axis direction corresponds to the horizontal front-rear direction, and the Z axis direction corresponds to the vertical, perpendicular direction. In particular, the X axis direction corresponds to the width direction of the vehicle 8 and the Y axis direction corresponds to the front-rear direction of the vehicle 8.

The driving assistance device 10 according to the embodiment is installed in a vehicle provided with an automatic driving mode and a manual driving mode. For example, an automatic driving mode is a mode that controls at least one of the accelerator, brake, and steering automatically. Accelerator control is for accelerating the vehicle. Accelerator control corresponds to stepping on the accelerator pedal in the manual driving mode. Brake control is for decelerating or stopping the vehicle. Brake control corresponds to stepping on the brake pedal in the manual driving mode. Steering control is for regulating the direction of travel of the vehicle in either direction of the vehicle width. Steering control corresponds to the operation of turning the steering wheel in the manual driving mode.

The driving assistance device 10 is capable of switching between the automatic driving mode and the manual driving mode. For example, the manual driving mode may be automatically selected in the initial state in which the vehicle is at a stop, for example. By way of example, the driving assistance device 10 may switch the driving mode to the automatic driving mode when the driver who has started to travel on a road suited to the automatic driving mode performs an operation of switching to the automatic driving mode. Further, the driving assistance device 10 may switch the driving mode to the manual driving mode when the driver performs an operation of switching to the manual driving mode while the vehicle is traveling in the automatic driving mode. These operations may be performed by, for example, pressing a user control button to switch the mode. Alternatively, a voiced instruction may be provided.

In the automatic driving mode, it is desired that the driver monitor the situation inside and outside the vehicle, switch to the manual driving mode at an arbitrary point of time depending on the situation, and have a will to take over the driving. To meet this purpose, the driving assistance device 10 is configured to sense whether the driver has a will to drive in the manual driving mode. When it is sensed that the driver has a will to drive to override during automatic driving mode, the driving assistance device 10 continues the automatic driving mode. When it cannot be sensed that the driver has a will to drive, the driving assistance device 10 continues the automatic driving mode and, at the same time, alerts the driver in some way or other. A detailed description will be given with reference to the drawings.

Figure 2:
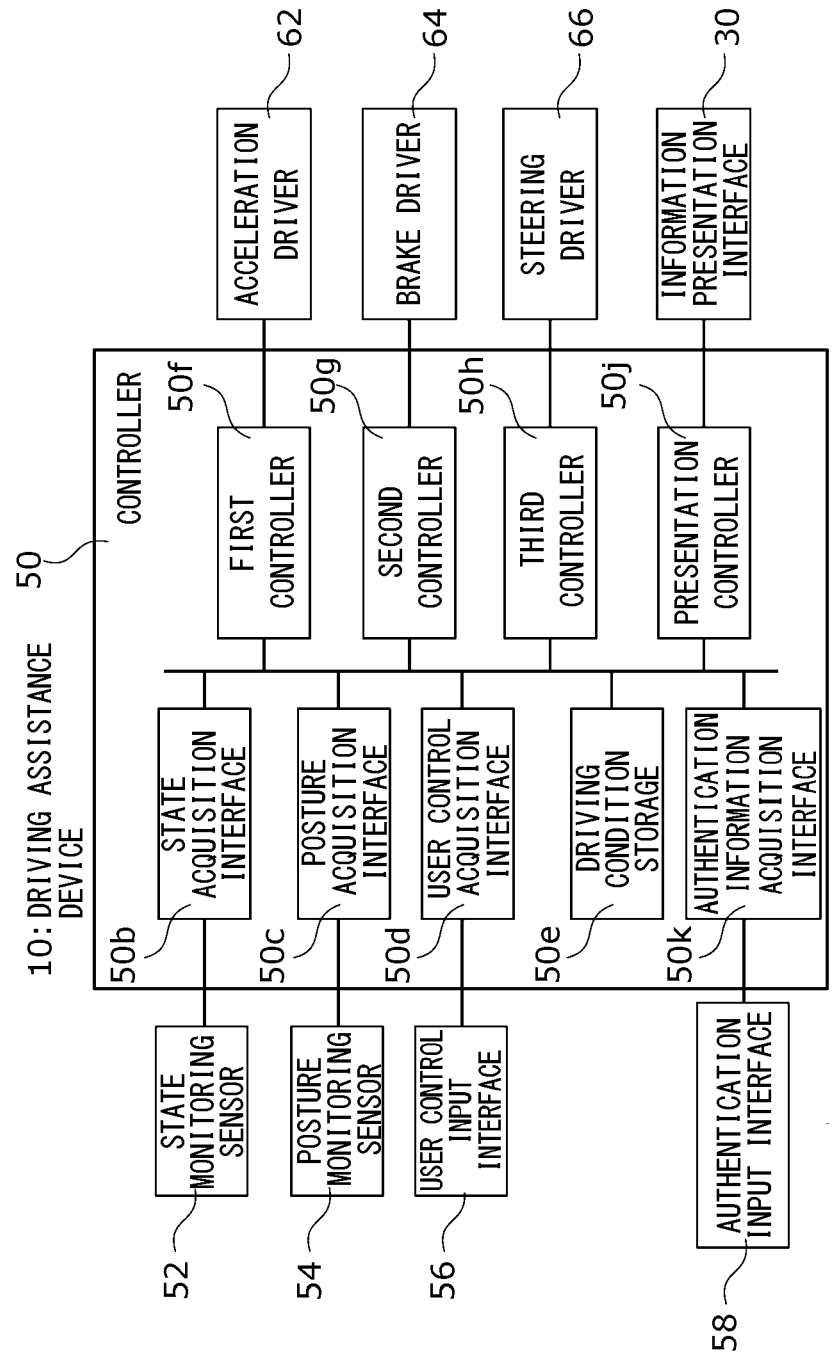
FIG. 2 is a block diagram showing the driving assistance device of FIG. 1.

FIG. 2 is a block diagram showing the driving assistance device 10 according to the embodiment. The driving assistance device 10 primarily includes a controller 50, a state monitoring sensor 52, a posture monitoring sensor 54, a user control input interface 56, an authentication input interface 58, an accelerator driver 62, a brake driver 64, a steering driver 66, and an information presentation interface 30. The user control input interface 56 is a man-machine interface for changing driving control while the vehicle is traveling in the automatic driving mode. The user control input interface 56 will be described later.

The accelerator driver 62, the brake driver 64, and the steering driver 66 are components controlled by the controller 50 in the automatic driving mode. The accelerator driver 62 increases or decreases the output of a prime mover such as an engine and a motor in accordance with the control by the controller 50 and initiates an action similar to the action initiated when the driver steps on the accelerator pedal. The brake driver 64 drives the actuator based on the control by the controller 50 and initiates an action similar to the action initiated when the driver steps on the brake pedal by increasing or decreasing the brake force. The steering driver 66 drives the steering mechanism to the right or left by driving the actuator under the control of the controller 50. This initiates an action similar to the action initiated when the steering wheel is turned.

(State Monitoring Sensor)

In the automatic driving mode, the state monitoring sensor 52 senses the state outside the vehicle 8, the speed of movements that take place inside the vehicle, and the status of the sound of vehicle traveling, using a camera, a sensor, a laser radar, etc. and outputs the result of sensing to the controller 50. In the automatic driving mode, the controller 50 controls the accelerator driver 62, the brake driver 64, and the steering driver 66 in accordance with a predefined algorithm and the result of sensing by the state monitoring sensor 52.

(Posture Monitoring Sensor)

Figure 3:
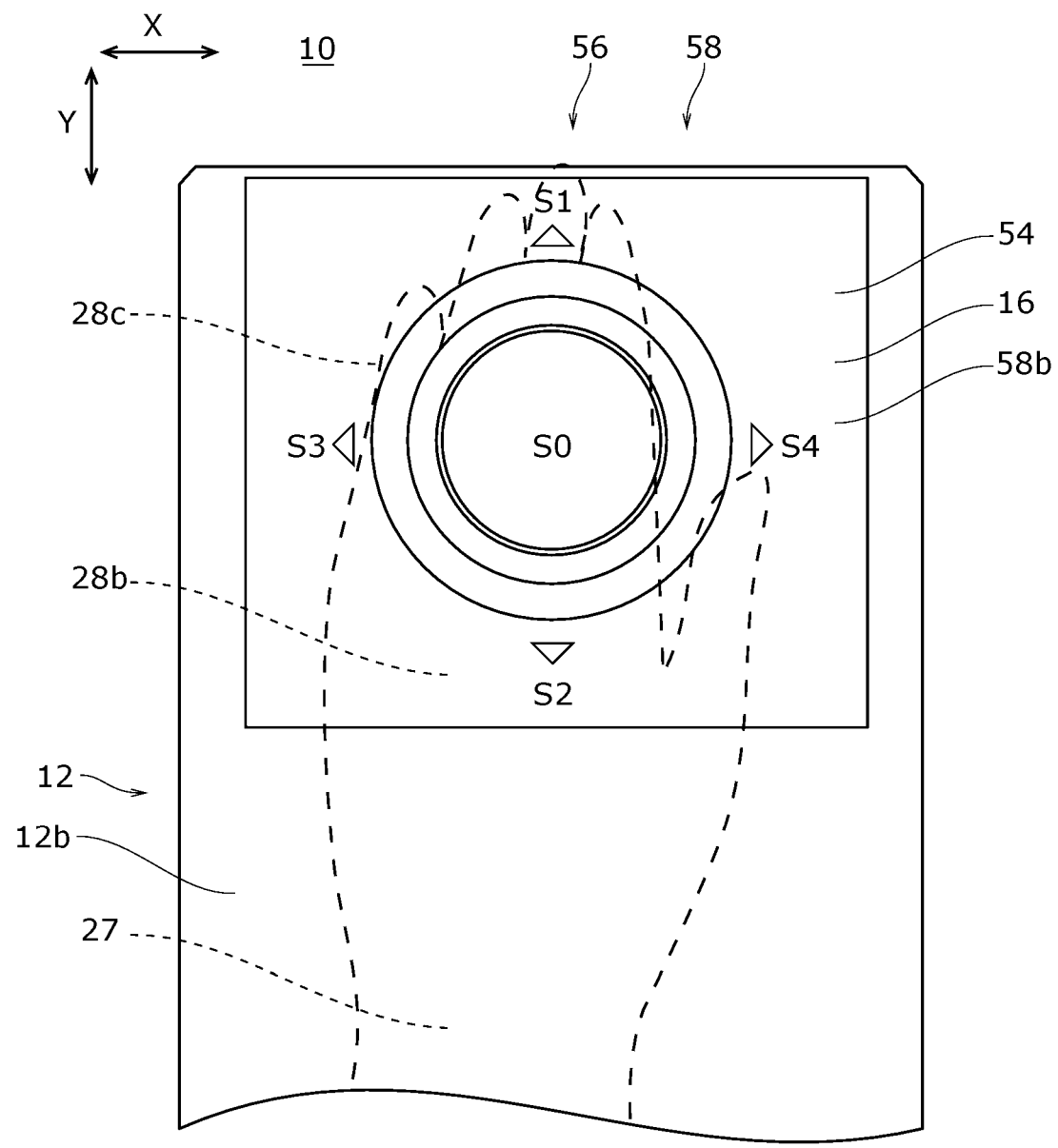
FIG. 3 is a plan view showing an example of the sensor of the driving assistance device of FIG. 1.

A description will be given of the posture monitoring sensor 54. The posture of a driver 22 is considered to be one criterion to determine whether the driver 22 has a will to drive. It can be determined that the driver 22 does not have a will to drive when the driver 22 is not seated in a seat 20 orienting the body forward, not placing arms 24 in a standby state on the respective sides of the body, and not placing an end 26 of the arm at a natural position (hereinafter, referred to as a standby posture). To meet this requirement, the driving assistance device 10 according to the embodiment is provided with a posture monitoring sensor 54. The posture monitoring sensor 54 according to the embodiment includes a sensor 16 to sense whether the driver 22 is in a standby posture. FIG. 3 is a plan view showing an example of the sensor 16. As shown in the figure, the sensor 16 is integrated with the user control input interface 56 described later.

The posture monitoring sensor 54 determines that the driver 22 is in a standby posture when the sensor 16 senses that a hand 28 of the driver 22 is positioned such that the hand 28 can reach the sensor 16 when the driver 22 rests the arm 24 on a standby member 12. In other words, it can be determined that the driver 22 is not in a standby posture and does not have a will to drive when the sensor 16 does not sense the hand 28 of the driver 22. The posture monitoring sensor 54 outputs the result of sensing by the sensor 16 to the controller 50.

The posture monitoring sensor 54 primarily includes the standby member 12 and the sensor 16. The standby member 12 is a member that allows the driver 22 seated in the seat 20 to place the arm 24 in a standby state. The standby member 12 may be implemented by various members. By way of example, the standby member 12 according to the embodiment includes an arm rest 12b where the driver can place the arm, wrist, elbow, etc. In this case, the arm rest 12b can alleviate the stress of the shoulder or arm of the driver 22 seated in the seat 20. By way of example, the arm rest 12b can be provided in the seat 20 or inside the door.

The sensor 16 is provided at a position that can be reached by the hand 28 of the driver when the driver 22 rests the arm 24 on the standby member 12 in a standby manner. By way of example, the sensor 16 may be provided at the front end of the arm rest 12b so that the hand 28 of the driver 22 can reach the sensor 16 in a natural manner. The arm 24 is defined, in particular, as a portion beyond the elbow. The end 26 of the arm includes a wrist 27 and the hand 28. The hand 28 includes a palm 28b of the hand and a finger(s) 28c. By way of example, the sensor 16 may be provided on the upper surface of the standby member 12 and integrated with the user control input interface 56 described later. The sensor 16 may be separate from the standby member 12 and may be provided on the seat 20 or fixed to the floor or the console. The sensor 16 senses that the hand 28 is placed on a sensor portion. The sensor 16 may include a sensing mechanism based on a variety of principles. According to the embodiment, the sensor 16 includes, by way of example, an electrostatic sensor configured to sense the hand 28 by referring to a variation in the capacitance. The sensor 16 may be integrated with an authentication sensor 58b of the authentication input interface 58.

(Authentication Input Interface)

The authentication input interface 58 is provided with a sensing function for authenticating the personal identity of the driver 22. For personal authentication of the driver 22, authentication systems based on various principles can be used. In the embodiment, the authentication input interface 58 includes the authentication sensor 58b biometric authentication based on the palm of the hand or the finger of the driver 22. The authentication sensor 58b may be the sensor 16. In this case, the sensor 16 is provided with a sensing function for authenticating the personal identify of the driver 22. The authentication input interface 58 outputs personal authentication information sensed by the authentication sensor 58b to an authentication information acquisition interface 58k. The authentication information acquisition interface 50b will be described later. The authentication sensor 58b may be provided separately from the sensor 16.

Even when the driver is in a forward-bent posture, it cannot be said that the driver has a will to drive when, for example, the finger 28c is holding a cellular phone. In this background, the driving assistance device 10 according to the embodiment senses that the finger 28c of the driver 22 is in contact with the sensor 16. When the finger 28c of the driver 22 is holding a cellular phone, the finger 28c is not in contact with the sensor 16 so that the sensor 16 can determine that the hand 28 is not sensed.

(Information Presentation Interface)

When a state other than the standby state lasts for a prolonged period of time, it is desirable that the driving assistance device 10 present certain information such as an alert sound to the driver. Therefore, the driving assistance device 10 according to the embodiment includes an information presentation interface 30 configured to present alert information when the sensor 16 does not sense the hand 28 beyond a predefined period of time T1 in the automatic driving mode. In this case, the driver is prompted to check the driving posture. When the predefined period of time T1 is too long, the driver may not be able to maintain concentration on the driving. When the predefined period of time T1 is too short, an alert is presented even when the driver is engaged in a user operation of, for example, listening to music for a short period of time. The frequency of alerts is increased and the driver may feel stressed. In the embodiment, the predefined period of time T1 is set to be, for example, several seconds~several tens of seconds from the viewpoint of maintaining concentration on the driving and relieving the driver of stress. The information presentation interface 30 may be configured to shorten the predefined period of time T1 as the speed of the vehicle 8 is increased.

The alert information can be presented in a manner sensible by people such as i) sound such as voice and buzzer sound, ii) turning on and off of an indicator light, iii) vibration, iv) an image such as an icon, a still image, and a movie, or v) a combination thereof. The information presentation interface 30 of the driving assistance device 10 according to the embodiment includes a speaker and a display, the speaker outputting an alert sound and the display outputting an alert image based on the control by a presentation controller 50j. The information presentation interface 30 may be mounted in, for example, the dashboard. The information presentation interface 30 may be built in a head-up display (HUD).

(Controller)

A description will now be given of the controller 50. The blocks of the controller 50 shown in FIG. 2 can be implemented in hardware such as devices or mechanical components exemplified by a Central Processing Unit (CPU) of a computer, and in software such as a computer program etc. FIG. 2 depicts functional blocks implemented by the cooperation of these elements. Therefore, it will be understood by those skilled in the art reading this specification that the functional blocks may be implemented in a variety of manners by a combination of hardware and software.

The controller 50 includes a state acquisition interface 50b, a posture acquisition interface 50c, a user control acquisition interface 50d, a driving condition storage 50e, an authentication information acquisition interface 50k, a first controller 50f, a second controller 50g, a third controller 50h, and a presentation controller 50j. The state acquisition interface 50b acquires the result of sensing the state inside and outside the vehicle 8 from the state monitoring sensor 52. The posture acquisition interface 50c acquires the result of sensing the posture of the driver 22 from the sensor 16 of the posture monitoring sensor 54. The user control acquisition interface 50d acquires the result of user control provided in user control interfaces of the user control input interface 56. The first controller 50f controls the accelerator driver 62 so as to increase or decrease the output of a prime mover such as an engine and a motor. The second controller 50g controls the brake driver 64 so as to increase or decrease the brake force. The third controller 50h controls the steering driver 66 so as to drive the steering mechanism to the right or left. The presentation controller 50j controls the information presentation interface 30 so as to output a predetermined sound or image.

(Driving Condition Storage)

The driving condition storage 50e is an element that stores a driving condition in the automatic driving mode. By way of example, the driving condition storage 50e is capable of storing a condition that includes an acceleration condition to drive the accelerator, a deceleration condition to drive the brake, a track condition that defines the position of the track of the vehicle traveling in a vehicle lane, and an inter-vehicle distance condition that defines a distance to a vehicle in front. A plurality of driving condition storages 50e may be provided in a vehicle. This makes it possible to store driving conditions of a plurality of drivers separately so that automatic driving suited to each driver's preference can be realized. The driving condition storage 50e refers to the information acquired from the authentication information acquisition interface 50k and selects a corresponding driving condition, and sends the selected driving condition to the first controller 50f, the second controller 50g, and the third controller 50h.

(Authentication Information Acquisition Interface)

The authentication information acquisition interface 50k acquires personal authentication information sensed by the authentication sensor 58b of the authentication input interface 58. The authentication information acquisition interface 50k stores the personal authentication information corresponding to respective drivers. The authentication information acquisition interface 50k identifies the driver based on the personal authentication information acquired from the authentication input interface 58 and the personal authentication information stored, and outputs the identified information to the driving condition storage 50e.

(User Control Input Interface)

A description will be given of the user control input interface 56. In the automatic driving mode, driving conditions such as those for acceleration, deceleration, etc. are predefined based on an average driving pattern. However, the preferred driving condition may differ depending on the driver. When the driver is only given an option of selecting either automatic driving or manual driving, the driver may feel stressed when the driving condition in automatic driving differs from the preference. This is addressed in the driving assistance device 10 according to the embodiment by providing the user control input interface 56 capable of changing the track of the vehicle traveling in the automatic driving mode. The user control input interface 56 is a man-machine interface for changing the driving condition in the automatic driving mode in accordance with the driver's preference. The user control input interface 56 may be configured to change at least one of an acceleration condition to drive the accelerator, a deceleration condition to drive the brake, a condition for the track of the vehicle traveling in the lane, and an inter-vehicle distance condition. The embodiment is configured such that each of the four conditions can be changed.

Figure 4:
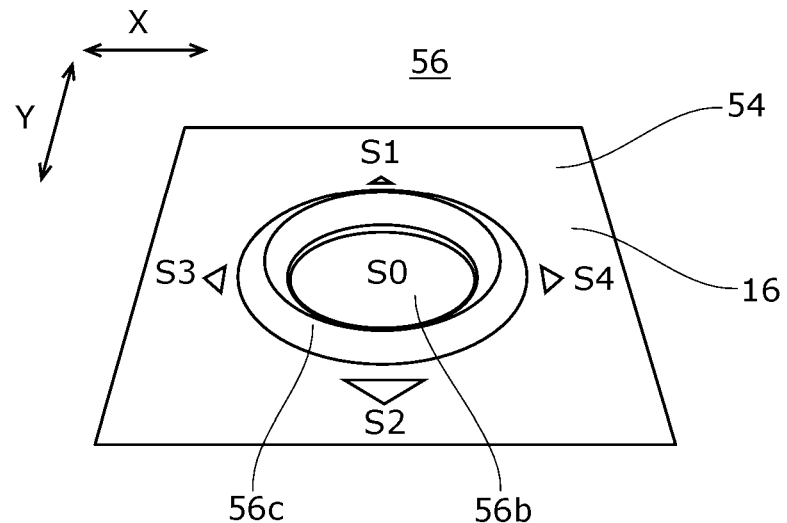
FIG. 4 is a perspective view of an example of the user control input interface of the driving assistance device of FIG. 1.

FIG. 4 is a perspective view of an example of the user control input interface 56. As shown in FIG. 4, the user control input interface 56 is provided in the vicinity of the sensor 16. More specifically, the user control input interface 56 is provided inside the sensor 16. The user control input interface 56 may be provided around the sensor 16. The user control input interface 56 includes five user controllers S0~S4. In the example of FIG. 4, the user control input interface 56 includes a substantially circular push button 56*b* and an annular user control ring 56*c* surrounding the push button 56*b*. The push button 56*b* corresponds to the user controller S0, and the user control ring 56*c* corresponds to the user controllers S1~S4. More specifically, it is sensed that the user controller S0 is manipulated when the push button 56*b* is pressed down. The user control ring 56*c* is configured to change the acceleration condition, deceleration condition, inter-vehicle distance condition, and a traveling track condition by tilting the user control ring 56*c*. When the user control ring 56*c* is tilted by pressing the frontal part, it is sensed that the user controller S1 is manipulated. When user control ring 56*c* is tilted by pressing down the rear part, it is sensed that the user controller S2 is manipulated. When the user control ring 56*c* is tilted by pressing down the left part, it is sensed that the user controller S3 is manipulated. When the user control ring 56*c* is tilted by pressing down the right part, it is sensed that the user controller S4 is manipulated.

The user controller S0 is for switching between the automatic driving mode and the manual driving mode. Each time the user controller S0 is pressed down, the mode is switched in an alternate manner. The user controllers S1 and S2 are for changing the acceleration condition, deceleration condition, and inter-vehicle distance condition. By manipulating the user controllers S1 and S2 during acceleration or deceleration, the acceleration condition or the deceleration condition can be changed. For example, during acceleration, the rate of acceleration is gradually increased by manipulating the user controller S1, and the rate of acceleration is gradually decreased by manipulating the user controller S2. During deceleration, the rate of deceleration is gradually decreased by manipulating the user controller S1, and the rate of deceleration is gradually increased by manipulating the user controller S2. By manipulating the user controllers S1 and S2 while the vehicle is traveling to follow the vehicle in front, the inter-vehicle distance condition can be changed. For example, while the vehicle is traveling to follow the vehicle in front, the inter-vehicle distance is gradually decreased by manipulating the user controller S1, and the inter-vehicle distance is gradually increased by manipulating the user controller S2.

The user controllers S3 and S4 are for changing the traveling track condition. The traveling track is defined as a transversal position of the vehicle in a lane marked by two marking lines on a road. When the user controller S3 is manipulated while the vehicle is travelling on a vehicle lane marked by a marking line, the traveling track, which is defined as the transversal position, is gradually shifted toward left. When the user controller S4 is manipulated, the traveling track is gradually shifted toward right. The driving condition thus changed by the manipulation is stored in the driving condition storage 50*e*.

Figure 5:
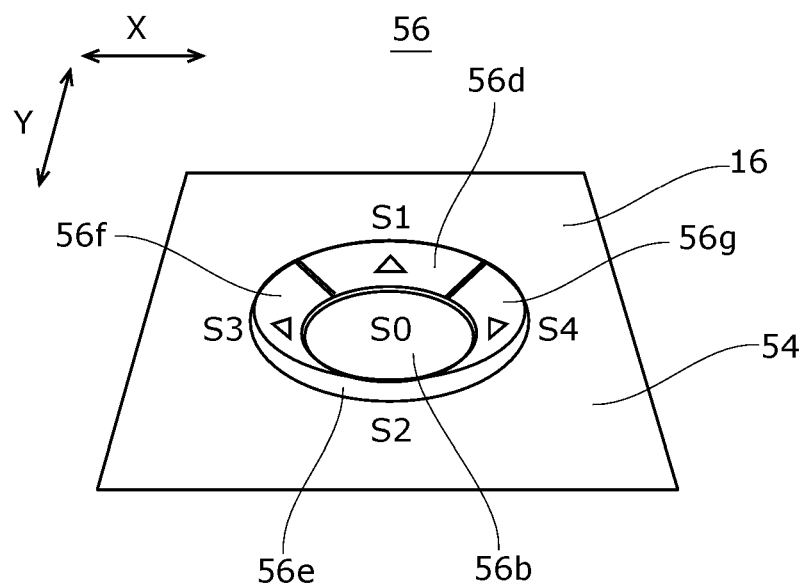
FIG. 5 is a perspective view showing another example of the user control input interface.

FIG. 5 is a perspective view showing another example of the user control input interface 56. In the example of FIG. 5, the user control input interface 56 includes a substantially circular push button 56*b* and four user control buttons 56*d*~56*g* circumferentially segmented to surround the push button 56*b*. The push button 56*b* corresponds to the user controller S0, and the user control buttons 56*d*~56*g* correspond to the user controllers S1~S4. More specifically, it is sensed that the user controller S0 is manipulated when the push button 56*b* is pressed down. When the user control button 56*d* is pressed down, it is sensed that the user controller S1 is manipulated. When the user control button 56*e* is pressed down, it is sensed that the user controller S2 is manipulated. When the user control button 56*f* is pressed down, it is sensed that the user controller S3 is manipulated. When the user control button 56*g* is pressed down, it is sensed that the user controller S4 is manipulated. The actions initiated by the user controllers S0~S4 are the same as those of the example of FIG. 4.

Figure 6:
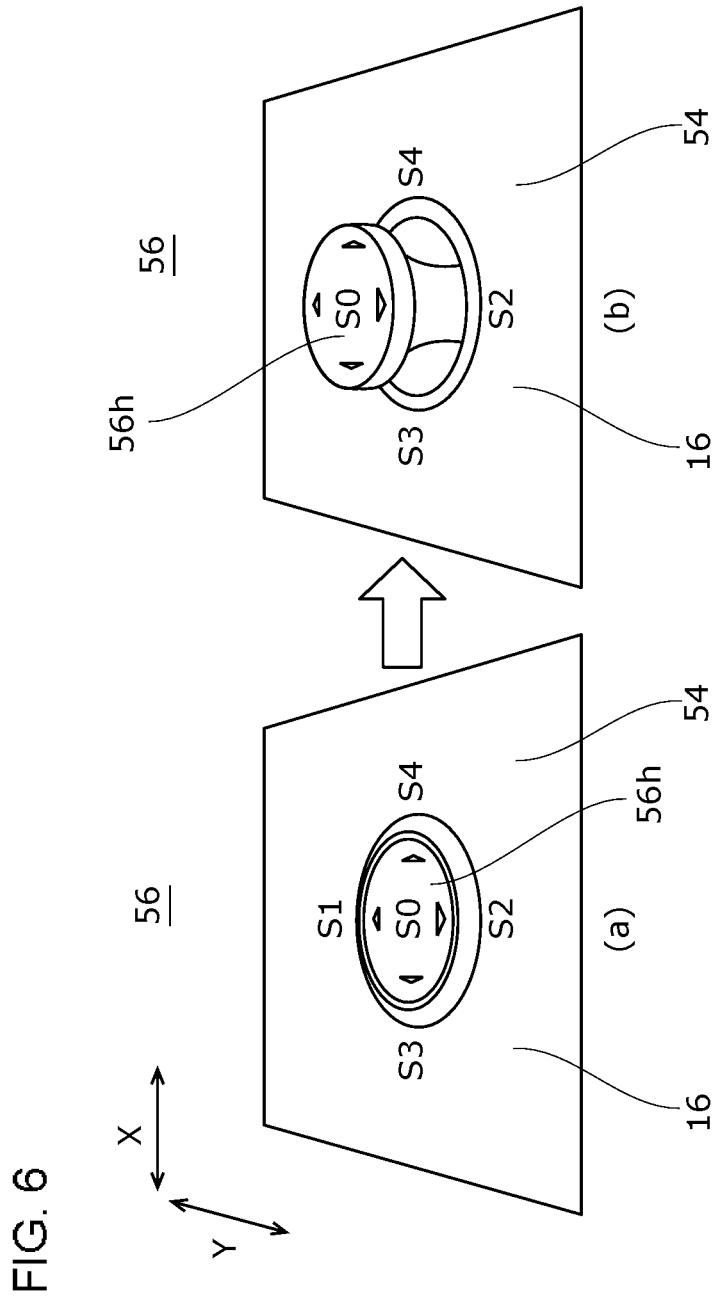
FIG. 6 is a perspective view of still another example of the user control input interface.

FIG. 6 is a perspective view of still another example of the user control input interface 56. In the example of FIG. 6, the user control input interface 56 includes a joystick 56*h* of a stick shape that is elevated when pressed down. The joystick 56*h* is configured to change the acceleration condition, deceleration condition, inter-vehicle distance condition, and the traveling track condition by tilting the joystick 56*h*. The joystick 56*h* is configured to be alternately depressed or elevated each time the joystick 56*h* is pressed down. For example, elevation and depression of the joystick 56*h* correspond to the user controller S0 and the joystick 56*h* in the elevated state corresponds to the user controllers S1-S4. In essence, when the joystick 56*h* is pressed down and elevated or depressed accordingly, it is sensed that the user controller S0 is manipulated. When the joystick 56*h* in the elevated state is tilted forward, it is sensed that the user controller S1 is manipulated. When the joystick 56*h* is tilted rearward, it is sensed that the user controller S2 is manipulated. When the joystick 56*h* is tilted leftward, it is sensed that the user controller S3 is manipulated. When the joystick 56*h* is tilted rightward, it is sensed that the user controller S4 is manipulated. The actions initiated by the user controllers S0~S4 are the same as those of the example of FIG. 4. Given above is a description of the user control input interface 56.

(Operation)

Figure 7:
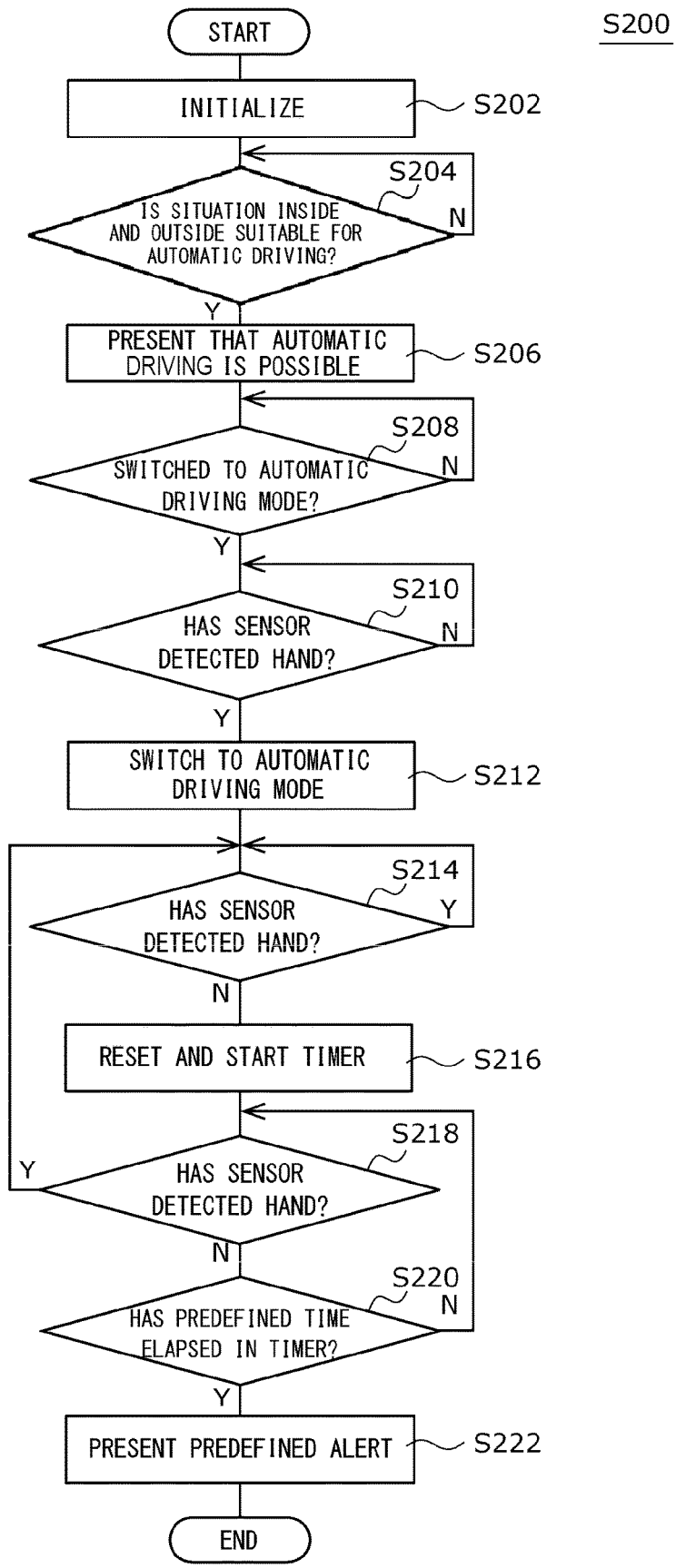
FIG. 7 is a flowchart showing an example of the operation of the driving assistance device of FIG. 1.

A description will now be given of an example of the operation of the driving assistance device 10 configured as described above. FIG. 7 is a flowchart showing an example of the operation of the driving assistance device 10. The flowchart shows a process S200 executed in the driving assistance device 10 when the vehicle travels in the automatic driving mode. When the vehicle 8 starts to travel and the driving assistance device 10 is put into operation, the controller 50 initializes the components (step S202). When the initialization is done, the state acquisition interface 50*b* of the controller 50 acquires the result of sensing the state inside and outside the vehicle 8 from the state monitoring sensor 52 and determines whether automatic driving is suitable (step S204). When automatic driving is not suitable (N in step S204), the controller 50 returns the process to step S204. When automatic driving is suitable (Y in step S204), the controller 50 causes the information presentation interface 30 to present that automatic driving is possible (step S206).

The controller 50 having executed step S206 acquires the result of user control from the user control input interface 56 and determines whether the automatic driving mode is selected (step S208). When automatic driving mode is not selected (N in step S208), the controller 50 returns the process to step S208. When the automatic driving mode is selected (Y in step S208), the controller 50 acquires the result of sensing from the sensor 16 of the posture monitoring sensor 54 and determines whether the hand 28 is sensed (step S210). When the hand 28 is not sensed (N in step S210), the controller 50 returns the process to step S210. When the hand 28 is sensed (Y in step S210), the controller 50 switches to the automatic driving mode and performs automatic driving (step S212).

The controller 50 having executed step S212 acquires the result of sensing from the sensor 16 of the posture monitoring sensor 54 and determines whether the hand 28 is sensed (step S214). When the hand 28 is sensed (Y in step S214), the controller 50 returns the process to step S214. When the hand 28 is not sensed (N in step S214), the controller 50 resets and starts an internal timer (step S216). This is to present a predefined alert when the sensor 16 does not sense the hand 28 beyond a predefined duration.

The controller 50 having executed step S216 acquires the result of sensing from the sensor 16 of the posture monitoring sensor 54 and determines whether the hand 28 is sensed (step S218). When the hand 28 is sensed (Y in step S218), the controller 50 returns the process to step S214. This is to continue the automatic driving mode when the posture is normalized in a short period of time. When the hand 28 is not sensed (N in step S218), the controller 50 determines whether the period of time T1 has elapsed in the internal timer (step S220). When the period of time T1 has not elapsed (N in S220), the controller 50 returns the process to step S218. When the period of time T1 has elapsed (Y in S220), the controller 50 causes the information presentation interface 30 to present a predefined alert message (step S222). For example, the controller 50 may output a voiced message prompting the driver to normalize the driving posture. The controller having executed step S222 ends the process S200.

A description will now be given of the benefit and advantage provided by the driving assistance device 10 according to the embodiment configured as described above.

The driving assistance device 10 according to the embodiment is for a vehicle 8 provided with an automatic driving mode and a manual driving mode, the driving assistance device 10 comprising: a standby member 12 on which a driver 22 seated in a seat rests an arm 24 in a standby manner, a sensor 16 that senses that a hand 28 of the driver 22 is positioned such that the hand 28 can reach the sensor 16 when the driver 22 rests the arm 24 on the standby member 12. According to this configuration, it can be determined that the driver 22 is a standby posture and has a will to drive when it is sensed that the hand 28 is placed on the sensor 16. Since it is possible to sense a will to drive while the driver is in a relaxed posture, the strain on the driver 22 is reduced and the fatigue felt by the driver driving for a long time can be mitigated. By reducing the stress, it is possible to create a state in which the driver is deeply involved in the duty of driving.

In the driving assistance device 10 according to the embodiment, the sensor 16 senses that the finger 28c of the driver 22 is in contact with the sensor 16. According to this configuration, the sensing range of the sensor 16 can be limited to an area corresponding to the finger 28c so that the size of the sensor 16 can be reduced. Since the finger 28c is not in contact with the sensor 16 while, for example, the finger 28c of the driver 22 is holding a cellular phone, the sensor 16 can determine that the hand 28 is not sensed.

In the driving assistance device 10 according to the embodiment, the sensor 16 is provided in an arm rest 12b. According to this configuration, a will to drive of the driver 22 can be checked in a state in which the stress in the shoulder or the arm 24 is mitigated.

The driving assistance device 10 according to the embodiment includes the information presentation interface 30 that presents alert information when the sensor 16 does not sense the hand 28 beyond a predefined period of time T1 in the automatic driving mode. According to this configuration, concentration of the driver on driving can be maintained by presenting alert information. As compared to the case of alerting immediately when the sensor 16 does not sense the hand 28, the frequency of alerts is optimized and the stress on the driver is reduced.

The driving assistance device 10 according to the embodiment is further provided with the user control input interface 56, which is a member that can be manipulated change the traveling track in the automatic driving mode. The user control input interface 56 is provided in the vicinity of the sensor 16. According to this configuration, the driving condition in the automatic driving mode can be changed in accordance with the preference of the driver 22. The traveling track in automatic driving can be changed while the driver 22 is in a relaxed state. Since the driving condition can be changed during automatic driving, the driving condition can approximate a more preferable condition. The preference of the driver can be learned so that automatic driving with even less stress can be realized.

In the driving assistance device 10 according to the embodiment, the user control input interface 56 is provided in the sensor 16. According to this configuration, the traveling track can be changed without moving the position of the hand so much.

In the driving assistance device 10 according to the embodiment, the user control input interface 56 includes the annular user control ring 56c or the joystick 56h capable of changing the traveling track by tilting the user control ring 56c or the joystick 56h. According to this configuration, the traveling track can be changed by tilting the ring or the joystick in a predefined direction so that smooth and seamless feel of user control can be provided.

In the driving assistance device 10 according to the embodiment, the sensor 16 is provided with a sensing function for authenticating the personal identity of the driver 22. According to this configuration, the sensor 16 is capable of not only monitoring the posture of the driver but also identifying the driver so that the number of components can be reduced as compared with a case where sensors are provided separately. Since the driver can indicate a will to drive and clear personal authentication with a small action, the stress from user control is mitigated.

A description will now be given of a variation. In the drawings and description of the variations, constituting elements and members identical or equivalent to those of the embodiments shall be denoted by the same reference numerals. Duplicative explanations are omitted appropriately and features different from those of the embodiments will be highlighted.

(First Variation)

The sensor 16 and the user control input interface 56 are described as being provided in the arm rest 12b. The embodiment is non-limiting as to the feature. The sensor 16 and the user control input interface 56 may be provided in a member other than the arm rest 12b so long as the hand of the driver can reach the sensor 16 and the user control input interface 56 while the drive rests the arm on the standby member. For example, the sensor 16 and the user control input interface 56 may be provided in a shift lever 19.

What is claimed is:

1. A driving assistance device for a vehicle provided with an automatic driving mode and a manual driving mode, the device comprising:

an arm rest on which a driver seated at a seat rests an arm;

a posture monitoring sensor including a hand sensor that senses whether a hand of the driver is placed at a position where the driver can reach the hand sensor while the driver rests the arm on the arm rest, the hand sensor being provided in the arm rest, the posture monitoring sensor being configured to determine whether the driver is in a predetermined posture defined by the hand of the driver being placed at the position;

an information presentation interface including at least one of a speaker and a display, the information presentation interface being configured to in response to the hand sensor not sensing the hand at the position, start a timer that measures a period of time during which the hand sensor does not sense the hand in the automatic driving mode, and present alert information only in response to the period of time measured by the timer indicating a predefined period of time has elapsed, the alert information including a prompt for the driver to change a current posture of the driver to the predetermined posture; and a user control input device capable of changing a traveling track in the automatic driving mode, the user control input device being provided in the vicinity of the hand sensor, wherein the hand sensor surrounds the user control input device.

2. The driving assistance device according to claim 1, wherein the hand sensor senses whether a finger of the driver is in contact with the hand sensor.

3. The driving assistance device according to claim 1, wherein the user control input device includes an annular user control ring or a joystick capable of changing the traveling track by tilting the annular user control ring or the joystick.

4. The driving assistance device according to claim 1, wherein the hand sensor is provided with a sensing function for authenticating a personal identity of the driver.

5. A driving assistance device for a vehicle provided with an automatic driving mode and a manual driving mode, the device comprising:

an arm rest on which a driver seated at a seat rests an arm;

a posture monitoring sensor including a hand sensor that senses whether a hand of the driver is placed at a position where the driver can reach the hand sensor while the driver rests the arm on the arm rest, the posture monitoring sensor being configured to determine whether the driver is in a predetermined posture in response to the hand sensor sensing that the hand of the driver is placed at the position;

a user control input device capable of changing a traveling track in the automatic driving mode, the user control input device being provided in the vicinity of the hand sensor; and a controller that executes the automatic driving mode, wherein the controller continues execution of the automatic driving mode in response to the hand sensor of the posture monitoring sensor continuously sensing the hand at the position, and the hand sensor surrounds the user control input device.

* * * * *